(12) United States Patent
Kawai

(10) Patent No.: US 6,977,748 B2
(45) Date of Patent: Dec. 20, 2005

(54) IMAGE COMMUNICATION APPARATUS AND DATA STORAGE METHOD

(75) Inventor: Shinichi Kawai, Utsunomiya (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 945 days.

(21) Appl. No.: 09/814,707

(22) Filed: Mar. 23, 2001

(65) Prior Publication Data

US 2002/0051202 A1 May 2, 2002

(30) Foreign Application Priority Data

Mar. 31, 2000 (JP) .............................. 2000-099211

(51) Int. Cl.⁷ ............................................. G06F 15/00
(52) U.S. Cl. .................... 358/1.16; 358/1.15; 358/404; 358/444
(58) Field of Search ............................. 358/1.16, 1.15, 358/404, 444, 443, 474; 382/323

(56) References Cited

U.S. PATENT DOCUMENTS

| | | | |
|---|---|---|---|
| 4,887,165 A | 12/1989 | Sato et al. .................. | 358/474 |
| 5,315,403 A | 5/1994 | Hirai et al. ................. | 358/404 |
| 5,898,824 A * | 4/1999 | Kato et al. ................. | 358/1.16 |
| 5,923,439 A | 7/1999 | Tomida et al. .............. | 354/404 |

FOREIGN PATENT DOCUMENTS

| | | |
|---|---|---|
| EP | 0782048 | 7/1997 |
| FR | 2656482 | 6/1991 |
| JP | 7193664 | 7/1995 |
| JP | 9238213 | 9/1997 |
| JP | 1127486 | 1/1999 |
| JP | 1141385 | 2/1999 |
| JP | 2000101814 | 4/2000 |

OTHER PUBLICATIONS

English Language Abstract of FR 2 656 482.
English Language Abstract of JP Appln. No. 2000-101814.
English Language Abstract of JP Appln. No. 7-193664.
English Language Abstract of JP Appln. No. 11-41385.
English Language Abstract of JP Appln. No. 9-238213.
English Language Abstract of JP Appln. No. 11-27486.

* cited by examiner

Primary Examiner—Twyler Lamb
(74) Attorney, Agent, or Firm—Greenblum & Bernstein, P.L.C.

(57) ABSTRACT

The image communication apparatus of the present invention compares the capacity of data received from a communication line with the capacity of existing memory of the image communication apparatus and determines the presence or absence of any expanded memory in the image communication apparatus when the capacity of the received data exceeds the capacity of the existing memory. Then, when the expanded memory is present, the image communication apparatus compares the capacity of the expanded memory with the capacity of the received data and stores the received data in the expanded memory when the capacity of the expanded memory exceeds the capacity of the received data.

9 Claims, 4 Drawing Sheets

IMAGE COMMUNICATION APPARATUS AND DATA STORAGE METHOD

BACKGROUND OF THE INVENTION

1. Field of the Invention

The present invention relates to an image communication apparatus and a method of storing data thereof capable of rewriting a program stored in memory.

2. Description of the Related Art

A facsimile apparatus is conventionally known, which receives a new program from an external facsimile apparatus or external personal computer (hereinafter referred to as "PC") through a telephone line and upgrades the apparatus by replacing a program stored inside the apparatus by the new program.

However, such a facsimile apparatus has a problem that in the case where the capacity of the new program exceeds the capacity of memory inside the apparatus, it is impossible to store the new program in memory inside the apparatus or rewrite the program inside the apparatus.

SUMMARY OF THE INVENTION

It is an object of the present invention to provide an image communication apparatus and data storage method capable of reliably rewriting a program inside the apparatus with a program received through a telephone line by using expanded memory.

That is, the image communication apparatus and data storage method of the present invention compares the capacity of predetermined data received from a communication line with the capacity of existing memory in the apparatus, and in the case where the capacity of predetermined data exceeds the capacity of existing memory, determines the presence or absence of any expanded memory in the apparatus. In the case where there is expanded memory, the image communication apparatus and data storage method of the present invention compares the capacity of the expanded memory with the capacity of predetermined data and stores the predetermined data in the expanded memory when the capacity of the expanded memory exceeds the capacity of the predetermined data. In this way, the image communication apparatus and data storage method of the present invention determines not only the capacity of existing memory in the apparatus but also the presence or absence and capacity of expanded memory, and thereby determines whether or not to store the predetermined data received from the communication line, making it possible to reliably store the predetermined data in the apparatus.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, an embodiment of the present invention will be explained in detail below.

Figure 1:
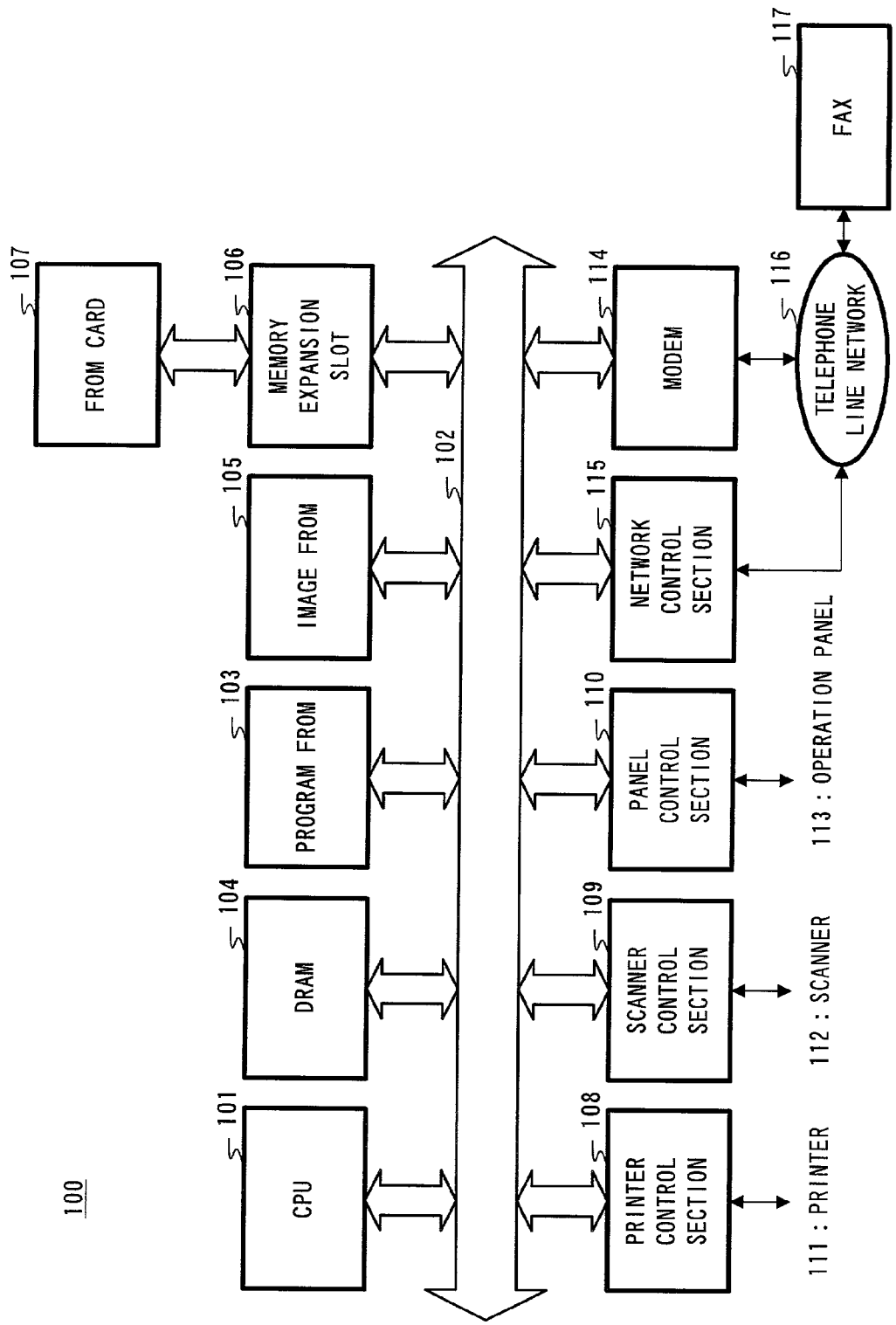
FIG. 1 is a block diagram showing an outlined configuration of a facsimile apparatus according to an embodiment of the present invention.

FIG. 1 is a block diagram showing an outlined configuration of a facsimile apparatus according to an embodiment of the present invention. Facsimile apparatus 100 according to this embodiment is provided with CPU 101 that controls the entire apparatus. This CPU 101 is connected with program FROM 103, DRAM 104, image FROM 105 and memory expansion slot 106 through control bus 102.

CPU 101 incorporates a RAM to store a program used when a program (hereinafter referred to as "present program") stored in program FROM 103 is rewritten. This prevents the function of facsimile apparatus 100 from stopping when the present program is rewritten.

Program FROM 103 stores a program to be executed by CPU 101. CPU 101 controls the aforementioned components of facsimile apparatus 100 through control bus 102 by executing this program. This allows facsimile apparatus 100 to implement the facsimile communication function.

DRAM 104 is used as work memory for CPU 101. DRAM 104 is also used as page memory to store one page of image data when facsimile apparatus 100 records images.

Image FROM 105 stores image data read by a scanner, which will be described later, and image data received through a telephone line network. Image FROM 105 stores a new program when the present program is rewritten.

Memory expansion slot 106 is a slot where a card memory such as FROM card 107, etc. is inserted. The memory capacity is expanded by inserting FROM card 107 in memory expansion slot 106. A new program and image data received through a telephone line network are stored in FROM card 107.

Control bus 102 is also connected with printer control section 108, scanner control section 109 and panel control section 110.

Printer control section 108 is connected to printer 111 and controls this printer 111. Printer 111 records image data under the control of printer control section 108. This allows facsimile apparatus 100 to record image data through printer 111.

Scanner control section 109 is connected to a reading apparatus such as scanner 112 and controls this scanner 112. Scanner 112 scans image data of a document under the control of scanner control section 109.

Panel control section 110 is connected with operation panel 113. The operator of facsimile apparatus 100 can send a predetermined instruction to facsimile apparatus 100 from this operation panel 113. Panel control section 110 communicates a command, etc. with this operation panel 113 and notifies CPU 101 of this command, etc.

Furthermore, control bus 102 is also connected with modem 114 and network control section 115.

Modem 114 communicates predetermined signals and image data through telephone line network 116. At this time, network control section 115 controls transmission/reception of signals, etc. with telephone line network 116. Through this function of CPU 101 of controlling modem 114 and network control section 115, facsimile apparatus 100 can perform facsimile communication with facsimile apparatus 117, etc., which is located in a remote place, through telephone line network 116.

Figure 2:
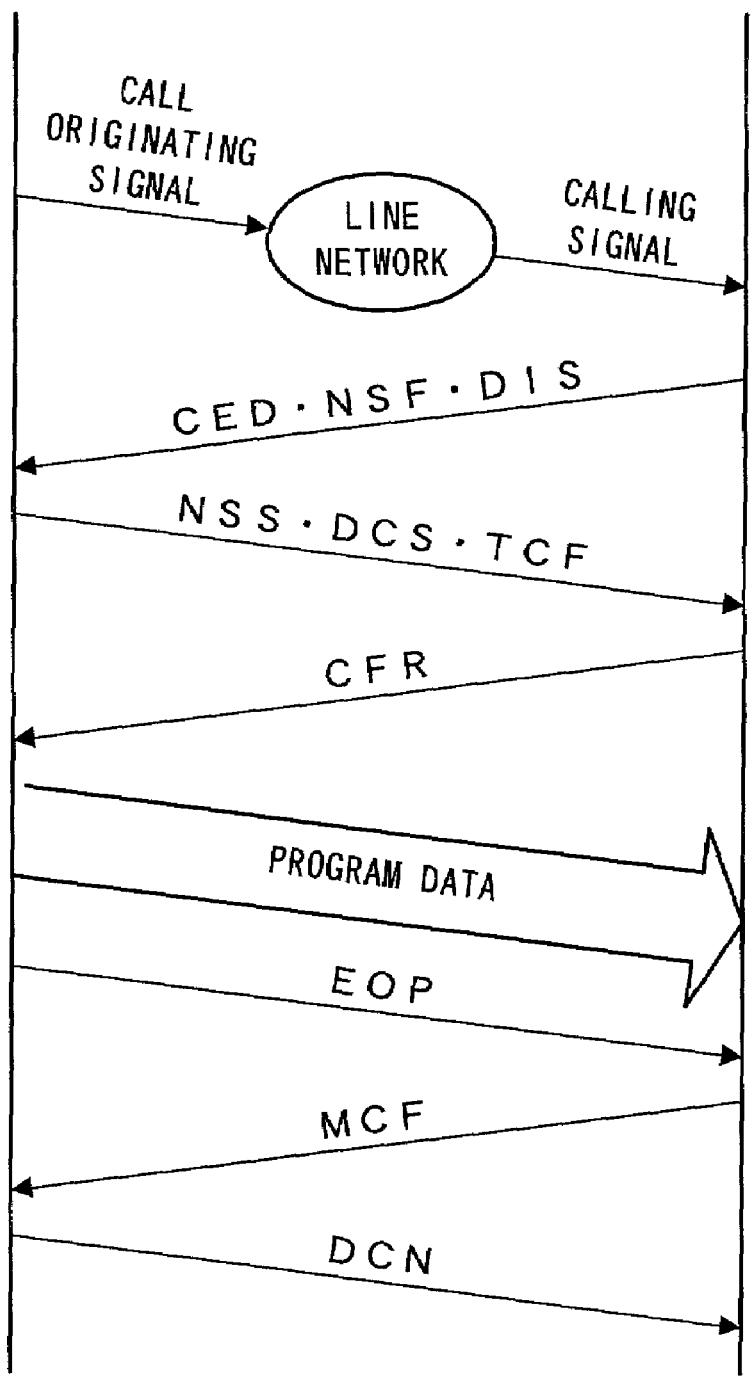
FIG. 2 is a sequence diagram of transmission/reception of signals or data between the facsimile apparatus according to the embodiment above and a facsimile apparatus, which is a transmitter.

Then, transmission/reception of signals or data by facsimile apparatus 100 in the above configuration when the program inside the apparatus is rewritten will be explained using the sequence diagram shown in FIG. 2. In FIG. 2, suppose facsimile apparatus 100 is a facsimile apparatus on the receiver side that receives the program through telephone line network 116.

When the program stored in program FROM 103 of facsimile apparatus 100 is rewritten, as shown in FIG. 2, a call originating signal output from facsimile apparatus on the transmitter side (hereinafter referred to as "transmitter") 200 is transmitted through telephone line network 116, converted to a calling signal by an exchange and output to facsimile apparatus 100.

Upon reception of this calling signal, facsimile apparatus 100 sends signals indicating ability (hereinafter referred to as "ability signal") such as a DIS signal indicating a standard function of facsimile apparatus 100, a CED signal to identify facsimile apparatus 100 and an NSF signal indicating a non-standard function of facsimile apparatus 100 to transmitter 200.

Upon reception of these ability signals, transmitter 200 sends an NSS signal indicating a transmission instruction as a response signal for the NSF signal, a DCS signal indicating a mode setting instruction as a response signal for the DIS signal and a TCF signal to check training to facsimile apparatus 100.

Figure 3:
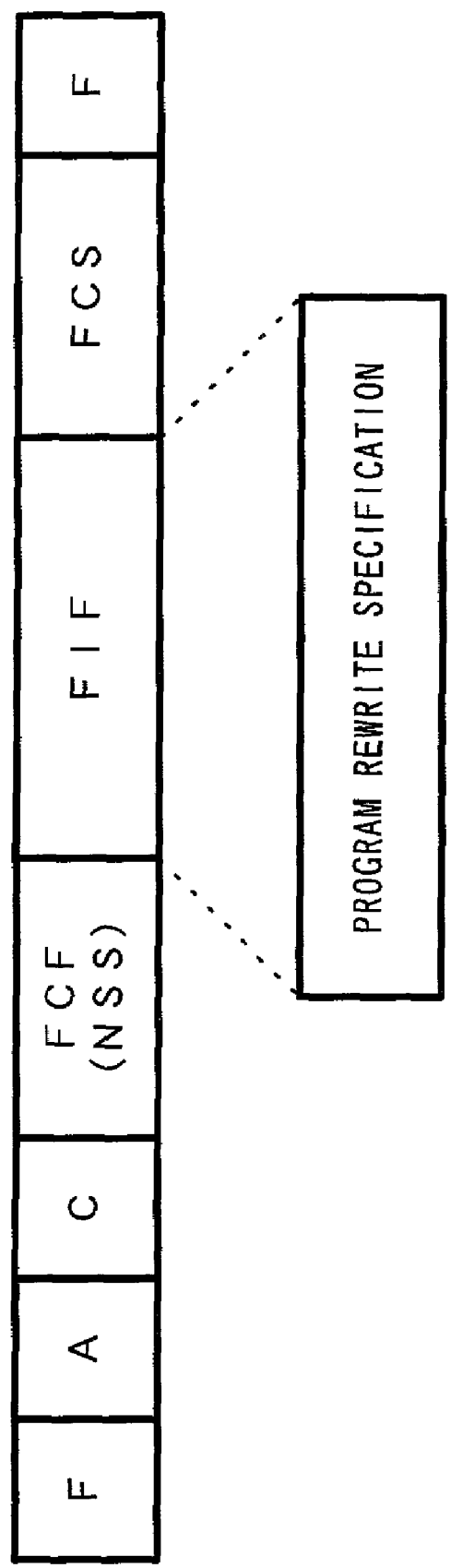
FIG. 3 is a frame configuration diagram of an NSS signal sent by the facsimile apparatus, which is the transmitter, to the facsimile apparatus according to the embodiment above.

Here, the NSS signal sent by transmitter 200 as a response signal for the NSF signal from facsimile apparatus 100 will be explained using FIG. 3. FIG. 3 illustrates a frame configuration of the NSS signal sent by transmitter 200.

As shown in FIG. 3, the frame of the NSS signal consists of a flag field (F) that indicates the beginning and end of the frame and is used to establish frame synchronization, an address field (A) used to transmit address information and a control field (C) used to identify the function of the frame.

Furthermore, the frame of the NSS signal includes a facsimile control field (FCF) to identify the function of a control signal. This facsimile control field (FCF) contains information identifiable as the NSS signal.

The frame of the NSS signal further includes a facsimile communication information field (FIF) to transmit function information, etc. of the transmitter. A flag indicating the program rewrite specification is set at a predetermined address of this facsimile communication information field (FIF).

Furthermore, the frame of the NSS signal includes a frame check sequence (FCS) to detect whether any transmission error exists or not from the address field (A) to the facsimile communication information field (FIF).

Then, upon reception of such response signals, facsimile apparatus 100 sends a CFR signal indicating that transmission of program data is allowed to start to transmitter 200 as shown in FIG. 2.

Upon reception of this CFR signal, transmitter 200 sends the program data to facsimile apparatus 100. Then, upon completion of the transmission of the program data, transmitter 200 sends an EOP signal that indicates the end of transmission of the program data and that there is no subsequent data to facsimile apparatus 100.

Upon reception of this EOP signal, facsimile apparatus 100 sends an MCF signal indicating that the program data has been received correctly to transmitter 200.

Then, transmitter 200 that has received this MCF signal sends a DCN signal indicating an instruction to disconnect the line that has been connected to facsimile apparatus 100, thereby disconnecting the line and terminating transmission/reception of signals or data between transmitter 200 and facsimile apparatus 100 when the program is rewritten.

Figure 4:
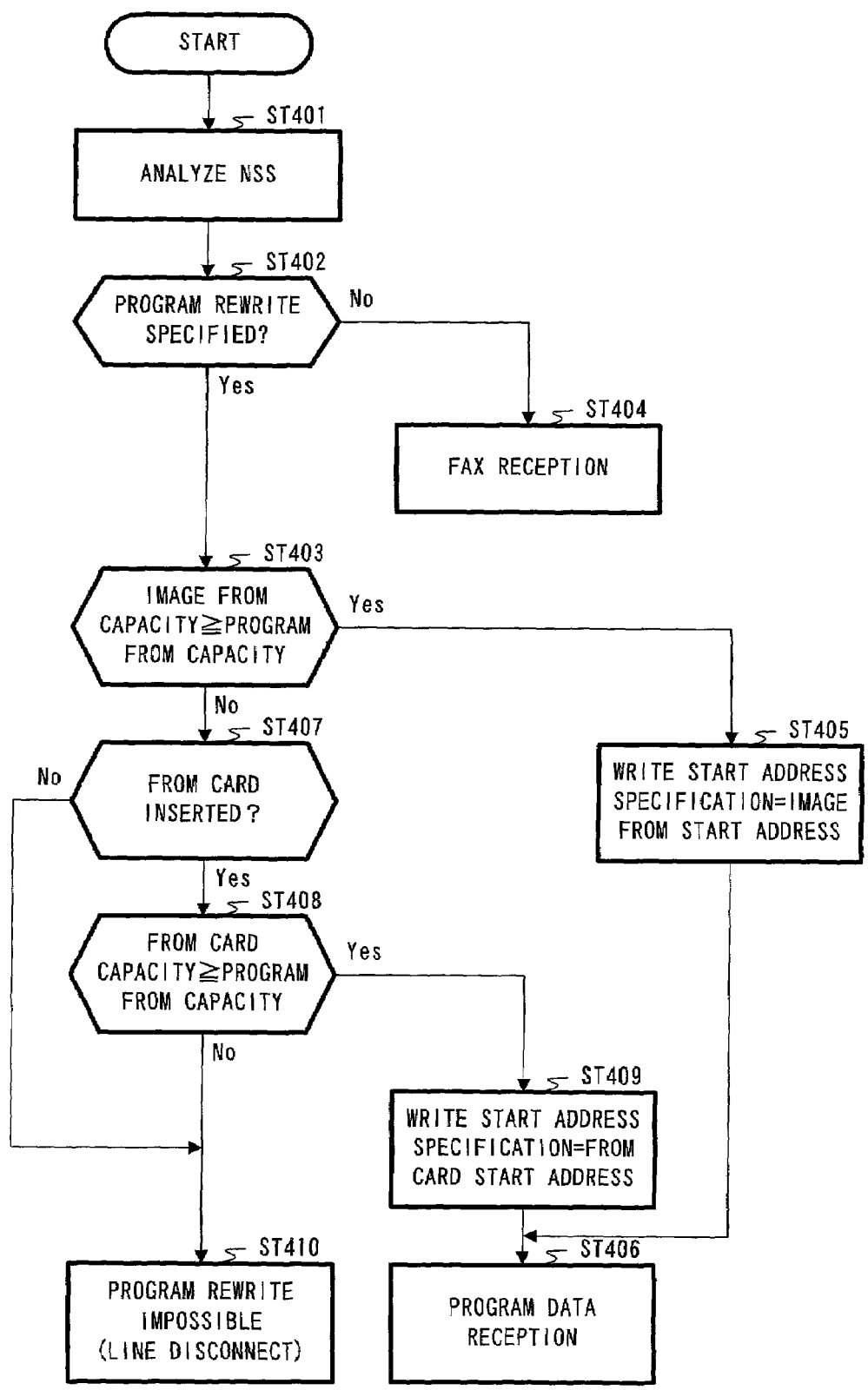
FIG. 4 is a flow chart when the facsimile apparatus according to an embodiment above rewrites a program.

Then, the operation of facsimile apparatus 100 when the present program is rewritten will be explained using FIG. 4. FIG. 4 is a flow chart when the program of facsimile apparatus 100 is rewritten.

When the program of facsimile apparatus 100 is rewritten, CPU 101 of facsimile apparatus 100 analyzes the frame of the NSS signal sent from transmitter 200 (ST 401) first and determines whether a flag indicating a program rewrite specification is set in the facsimile communication information field (FIF) of the frame of the NSS signal or not (ST 402).

In the case where the flag indicating a program rewrite specification is set in the facsimile communication information field (FIF) of the frame of the NSS signal, CPU 101 determines whether the memory capacity of image FROM 105 is larger than the memory capacity of program FROM 103 or not (ST 403). CPU 101 recognizes the memory capacities of image FROM 105 and program FROM 103 beforehand.

In this way, checking the memory capacity of image FROM 105 when the program is rewritten prevents facsimile apparatus 100 from failing to store the new program. By the way, suppose the capacity of the new program is equal to the memory capacity of program FROM 103.

In the case where the flag indicating a program rewrite specification is not set in the facsimile communication information field (FIF) of the frame of the NSS signal, CPU 101 performs normal facsimile communication and receives the image data sent from transmitter 200 (ST 404).

In ST 403, when the memory capacity of image FROM 105 is larger than the memory capacity of program FROM 103, CPU 101 specifies the address from which writing of the new program is started (ST 405). More specifically, CPU 101 specifies the start address of image FROM 105 as the address from which writing of the new program is started.

After specifying the start address of image FROM 105 as the address from which writing of the new program is started, CPU 101 receives program data via telephone line network 116 (ST 406). The received program data is stored in image FROM 105 under the control of CPU 101.

On the other hand, in ST 403, when the memory capacity of image FROM 105 is smaller than the memory capacity of program FROM 103, CPU 101 determines whether FROM card 107 is inserted in memory expansion slot 106 or not (ST 407). Here, suppose FROM card 107 is inserted in memory expansion slot 106.

After determining that FROM card 107 is inserted in memory expansion slot 106, CPU 101 determines whether the memory capacity of FROM card 107 is larger than the memory capacity of program FROM 103 or not (ST 408). By the way, CPU 101 recognizes the memory capacity of this FROM card 107 beforehand when FROM card 107 is inserted.

Thus, when the program is rewritten, if CPU 101 checks the memory capacity of image FROM 105 and determines that the new program cannot be stored, CPU 101 checks the memory capacity of FROM card 107 and thereby prevents facsimile apparatus 100 from failing to store the new program.

In the case where the memory capacity of FROM card 107 is larger than the memory capacity of program FROM 103, CPU 101 specifies the address from which writing of the new program is started (ST 409). More specifically, CPU 101 specifies the start address of FROM card 107 as the address from which writing of the new program is started.

After specifying the start address of FROM card 107 as the address from which writing of the new program is started, CPU 101 receives program data via telephone line network 116 (ST 406). The program data received is stored in FROM card 107 under the control of CPU 101.

Then, in ST406, when the program data is stored in image FROM 105 or FROM card 107, CPU 101 executes the program of rewriting the present program stored in the built-in RAM. This allows the present program to be rewritten with the new program.

On the other hand, when the memory capacity of FROM card 107 is smaller than the memory capacity of program FROM 103, CPU 101 determines that the capacity of the present memory of facsimile apparatus 100 is too small to store the new program and disconnects the line that has been connected with transmitter 200 (ST 410).

Moreover, in ST 407 when CPU 101 determines that FROM card 107 is not inserted in memory expansion slot 106, CPU 101 also determines that the capacity of the present memory of facsimile apparatus 100 is too small to store the new program and disconnects the line that has been connected with transmitter 200 (ST 410).

In ST 410, when CPU 101 determines that the new program cannot be stored, it is desirable for CPU 101 to display this determination on the display of operation panel 113 or notify this to transmitter 200, etc. which sent the new program via telephone line network 116. In this way, by displaying or notifying the determination, it is possible to call attention of the operator of facsimile apparatus 100 or the transmitter, etc. This makes it possible to urge the operator to carry out processing such as transmission of the program, etc.

As shown above, when the present program is rewritten with the new program, facsimile apparatus 100 according to this embodiment compares the memory capacity of image FROM 105 as the existing memory with the memory capacity of program FROM 103 and thereby determines whether the new program can be stored or not in image FROM 105. Then, in the case where facsimile apparatus 100 determines that the program cannot be stored in image FROM 105, facsimile apparatus 100 determines whether FROM card 107 as expanded memory is inserted or not. In the case where FROM card 107 is inserted, facsimile apparatus 100 compares the memory capacity of FROM card 107 with the memory capacity of program FROM 103 and thereby determines whether the new program can be stored in FROM card 107 or not. Thus, even if the new program cannot be stored in image FROM 105, in the case where FROM card 107 is inserted and the FROM card 107 has a memory capacity enough to store the new program, it is possible to store the new program. This prevents facsimile apparatus 100 from failing to receive the program via telephone line network 116 and rewrite the present program, and makes it possible to reliably rewrite the present program with the new program.

This embodiment describes the apparatus assuming that the new program has the same capacity as the memory capacity of program FROM 103. However, the present invention is not limited to this, and it is also possible to let the NSS signal from transmitter 200 indicate the capacity of the new program in the facsimile communication information field (FIF) and determine whether the new program can be stored in facsimile apparatus 100 or not based on the capacity. Modified in this way, the present invention can also handle the case where the capacity of the new program is smaller than the memory capacity of program FROM 103 and allow the program to be rewritten with a minimum memory capacity.

As described above, the present invention determines whether a program received through a telephone line network can be stored or not by determining not only the capacity of existing memory inside the apparatus alone but also the presence or absence of expanded memory and the capacity thereof, thus allowing the program inside the apparatus to be rewritten reliably with the program received through the telephone line network.

The present invention is not limited to the above described embodiments, and various variations and modifications may be possible without departing from the scope of the present invention.

This application is based on the Japanese Patent Application No. 2000-099211 filed on Mar. 31, 2000, entire content of which is expressly incorporated by reference herein.

What is claimed is:

1. An image communication apparatus comprising:
   a program memory configured to store a program, the image communication apparatus being controlled based on the program;
   a communicator configured to receive an updating program via a network;
   an internal memory configured to store the received updating program, the internal memory being built in the image communication apparatus;
   a memory slot configured to have an external memory card connected to the memory slot; and
   a controller configured, when the updating program is received, to judge whether a data amount of the received updating program exceeds a capacity of the internal memory, to store the received program in the internal memory when the data amount of the received updating program is judged not to exceed the capacity of the internal memory, and to update the program stored in the program memory, based on the updating program stored in the internal memory,
   the controller, when the a data amount of the received updating program is judged to exceed the capacity of the internal memory, being further configured to store the received program in the external memory card inserted into the memory slot, and to update the program stored in the program memory, based on the updating program stored in the external memory card.

2. An image communication apparatus comprising:
   a program memory configured to store a program, the image communication apparatus being controlled based on the program;
   a communicator configured to receive an updating program via a network;
   an internal memory configured to store the received updating program, the internal memory being built in the image communication apparatus;
   a memory slot configured to have an external memory card connected to the memory slot; and
   a controller configured, when the updating program is received, to judge whether a data amount of the received updating program exceeds a capacity of the internal memory, to store the received program in the internal memory when the data amount of the received updating program is judged not to exceed the capacity of the internal memory, and to update the program stored in the program memory, based on the updating program stored in the internal memory, the controller, when the data amount of the received updating program is judged to exceed the capacity of the internal memory, being further configured to judge whether the external memory card is inserted into the memory slot, to store the received program in the external memory card when the external memory card is judged to be inserted into the memory slot, and to update the program stored in the program memory based on the updating program stored in the external memory card.

3. The image communication apparatus according to claim 2, wherein the controller, when the external memory card is judged to be installed into the memory slot, judges whether or not the data amount of the received updating program exceeds a capacity of the external memory card, stores the received program in the external memory card when the data amount of the received updating program is judged not to exceed the capacity of the external memory card, and updates the program stored in the program memory based on the updating program stored in the external memory card.

4. The image communication apparatus according to claim 2, further comprising a display configured to display a message, wherein the display displays an error message when the external memory card is judged not to be inserted into the memory slot.

5. The image communication apparatus according to claim 3, further comprising a display configured to display a message, wherein the display displays an error message when the data amount of the received updating program is judged to exceed the capacity of the external memory card.

6. The image communication apparatus according to claim 2, wherein the controller transmits an error message to a transmitter of the received updating program when the external memory card is judged not to be inserted into the memory slot.

7. The image communication apparatus according to claim 3, wherein the controller transmits an error message to a transmitter of the received updating program when the data amount of the received updating program is judged to exceed the capacity of the external memory card.

8. A data storage method of an image communication apparatus, the image communication apparatus comprising a program memory configured to store a program, the image communication apparatus being controlled based on the program, the image communication apparatus comprising a communicator configured to receive an updating program via a network and an internal memory configured to store the received updating program, the internal memory being built in the image communication apparatus, the image communication apparatus further comprising a memory slot configured to have an external memory card connected to the memory slot, the data storage method comprising:

judging whether a data amount of the received updating program exceeds a capacity of the internal memory, when the updating program is received;

storing the received program in the internal memory when the a data amount of the received updating program is judged not to exceed the capacity of the internal memory;

updating the program stored in the program memory, based on the updating program stored in the internal memory;

storing the received program in the external memory card inserted into the memory slot when the a data amount of the received updating program is judged to exceed the capacity of the internal memory; and updating the program stored in the program memory, based on the updating program stored in the external memory card.

9. A data storage method of an image communication apparatus, the image communication apparatus comprising a program memory configured to store a program, the image communication apparatus being controlled based on the program, the image communication apparatus comprising a communicator configured to receive an updating program via a network and an internal memory configured to store the received updating program, the internal memory being built in the image communication apparatus, the image communication apparatus further comprising a memory slot configured to have an external memory card connected to the memory slot, the data storage method comprising:

judging whether a data amount of the received updating program exceeds a capacity of the internal memory, when the updating program is received;

storing the received program in the internal memory when the data amount of the received updating program is judged not to exceed the capacity of the internal memory;

updating the program stored in the program memory, based on the updating program stored in the internal memory;

judging whether the external memory card is inserted into the memory slot, when the a data amount of the received updating program is judged to exceed the capacity of the internal memory;

storing the received program in the external memory card when the external memory card is judged to be inserted into the memory slot; and updating the program stored in the program memory based on the updating program stored in the external memory card.

* * * * *